J. B. Blanchard.
Axle Box.
Patented Sept. 17, 1861.
No. 33,292.
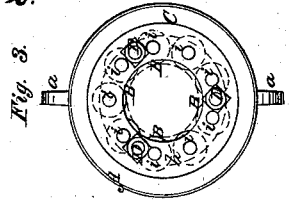
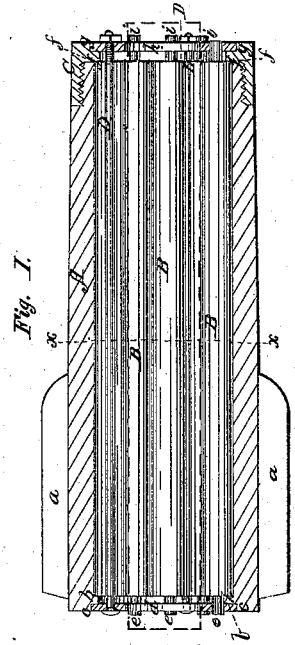
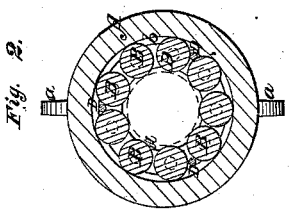
Witnesses,
J W Coombs
W Tusch
Inventor,
J. B. Blanchard
per Munn & Co
Attorneys

UNITED STATES PATENT OFFICE.

JACOB B. BLANCHARD, OF SACRAMENTO, CALIFORNIA.

IMPROVEMENT IN ANTI-FRICTION BOXES FOR CARRIAGE-WHEELS.

Specification forming part of Letters Patent No. 33,292, dated September 17, 1861.

*To all whom it may concern:*

Be it known that I, JACOB B. BLANCHARD, of Sacramento, in the county of Sacramento and State of California, have invented a new and useful Improvement in Anti-Friction Boxes for the Hubs of Carriage-Wheels; and I do hereby declare that the following is a full, clear, and exact description of the same, reference being had to the annexed drawings, making a part of this specification, in which—

Figure 1 is a longitudinal central section of my invention; Fig. 2, a transverse section of the same, taken in the line $xx$, Fig. 1; Fig. 3, an end view of the same.

Similar letters of reference indicate corresponding parts in the several figures.

This invention relates to an improvement in what are generally known as "anti-friction boxes for carriage-wheels," and which are formed by placing rollers within the box in the form of a hollow cylinder, and within which the arm of the axle is fitted.

The object of the within-described invention is to facilitate the adjusting of the rollers within the box, as well as their removal therefrom when necessary, and also to firmly and properly secure the rollers in the box, so that they will be retained in proper position and allowed to rotate freely on their axes individually, and also allowed to rotate collectively as a hollow cylinder around the arm of the axle, as hereinafter fully shown and described.

To enable those skilled in the art to fully understand and construct my invention, I will proceed to describe it.

A represents the box of the hub of a wheel. This box is of cast-iron, as usual, provided with flanges $a\ a$ at two opposite points to prevent the turning of the box in the hub. At the back or inner end of the box A, at its inner side, there is a ledge or shoulder $b$, which extends entirely around the box and serves as a bearing for the inner or back ends of rollers B, as shown clearly in Fig. 1, a recess $c$ being formed by this ledge or shoulder $b$ at the back end of the box to receive an annular plate $d$, in which the back journals $e$ of the rollers B are fitted and allowed to rotate freely, the plate $d$ being also allowed to rotate in its recess $c$, and said plate being flush with the inner or back end of the box A.

On the front end of the box A there is screwed a cap C. This cap is provided with a ledge or shoulder $f$ at its inner side, which extends entirely around it, and which serves as a bearing for the outer ends of the rollers B, as shown in Fig. 1. The ledge or shoulder $f$ of cap C forms a recess $g$ in the outer part of the cap to receive an annular plate $h$, in which the outer journals $i$ of the rollers B are fitted.

The two plates $d\ h$ are connected together by screw-rods D, which extend entirely through the box A. Three or more rods D may be employed, said rods being fitted between the rollers, as shown clearly in Figs. 2 and 3.

The arm of the axle (shown in red) passes within the rollers B, which form its bearing, the rollers B rotating around the arm as the box A revolves, and the plates $d\ h$ also rotating, so as to form an anti-friction cylinder of rollers. The outer sides of the rollers bear against the inner side of the box.

In order to adjust the rollers B in the box A and remove them therefrom, the cap C is unscrewed, the nuts at one end of the rods D being previously removed. This cap C forms a very ready means for securing the rollers in the box and removing them therefrom, the cap rendering all parts of the device accessible, so that repairs may readily be made when necessary.

I do not claim, broadly, the employment or use of anti-friction rollers B irrespective of the arrangement or means employed for securing the rollers in their box, for anti-friction rollers have been used and arranged in various ways; but,

Having thus described my invention, what I claim as new, and desire to secure by Letters Patent, is—

Securing the rollers B in the box A by means of the cap C, screwed on the outer end of the box A and provided with the ledge or shoulder $f$ and recess $g$, in connection with the ledge or shoulder $b$ at the inner or back end of the box A, and the annular plates $d\ h$ and screw-rods D, substantially as described.

JACOB B. BLANCHARD.

Witnesses:
C. ROBIN,
CHAS. L. SCUDDER.